United States Patent
Byron et al.

(10) Patent No.: US 10,033,184 B2
(45) Date of Patent: Jul. 24, 2018

(54) DEMAND RESPONSE DEVICE CONFIGURED TO PROVIDE COMPARATIVE CONSUMPTION INFORMATION RELATING TO PROXIMATE USERS OR CONSUMERS

(71) Applicant: Opower, Inc., Arlington, VA (US)

(72) Inventors: David Byron, Oakland, CA (US); Sudarshan Mandayam Aji, Alexandria, VA (US); Thom Loftus, San Francisco, CA (US); Edward L. Peters, Aldie, VA (US); Janet Yu, San Francisco, CA (US)

(73) Assignee: OPOWER, INC., Arlington, VA (US)

( * ) Notice: Subject to any disclaimer, the term of this patent is extended or adjusted under 35 U.S.C. 154(b) by 401 days.

(21) Appl. No.: 14/711,498

(22) Filed: May 13, 2015

(65) Prior Publication Data

US 2016/0141869 A1 May 19, 2016

Related U.S. Application Data

(60) Provisional application No. 62/079,510, filed on Nov. 13, 2014.

(51) Int. Cl.
*H02J 3/00* (2006.01)
*G05B 15/02* (2006.01)
*G06Q 50/06* (2012.01)

(52) U.S. Cl.
CPC ............... *H02J 3/00* (2013.01); *G05B 15/02* (2013.01); *G05B 2219/2642* (2013.01); *G06Q 50/06* (2013.01)

(58) Field of Classification Search
CPC ..................................................... G06Q 50/06
(Continued)

(56) References Cited

U.S. PATENT DOCUMENTS

| 4,334,275 A | 6/1982 | Levine |
| 4,843,575 A | 6/1989 | Crane |

(Continued)

FOREIGN PATENT DOCUMENTS

| AU | 2010315015 | 7/2014 |
| CA | 2779754 | 5/2011 |

(Continued)

OTHER PUBLICATIONS

International Search Report and Written Opinion for PCT Application No. PCT/US2015/038692, dated Sep. 24, 2015, 13 pages.

(Continued)

*Primary Examiner* — Suresh Suryawanshi
(74) *Attorney, Agent, or Firm* — Cooper Legal Group, LLC

(57) ABSTRACT

Aspects of the subject technology relate to a demand response device that is configured to receive comparison report information from a notification system, wherein the notification system is configured to execute steps including receiving at least one temperature report for each of a plurality of demand response devices, and identifying two or more demand response devices that share a common geographic location. In some aspects, a notification system of the subject technology can be further configured for generating a comparison report, wherein the comparison report is based on the ambient temperature information and the geolocation data for at least two of the plurality of demand response devices.

20 Claims, 5 Drawing Sheets

(58) Field of Classification Search
USPC .................................................. 700/291
See application file for complete search history.

(56) References Cited

U.S. PATENT DOCUMENTS

| | | |
|---|---|---|
| 5,513,519 A | 5/1996 | Cauger et al. |
| 5,566,084 A | 10/1996 | Cmar |
| 5,717,609 A | 2/1998 | Packa et al. |
| 5,855,011 A | 12/1998 | Tatsuoka |
| 5,873,251 A | 2/1999 | Iino |
| 5,930,773 A | 7/1999 | Crooks et al. |
| 5,930,803 A | 7/1999 | Becker et al. |
| 5,948,303 A | 9/1999 | Larson |
| 6,035,285 A | 3/2000 | Schlect et al. |
| 6,088,688 A | 7/2000 | Crooks et al. |
| 6,295,504 B1 | 9/2001 | Ye et al. |
| 6,327,605 B2 | 12/2001 | Arakawa et al. |
| D462,077 S | 8/2002 | Greminger |
| 6,606,104 B1 | 8/2003 | Kondo et al. |
| 6,701,298 B1 | 3/2004 | Jutsen |
| 6,732,055 B2 | 5/2004 | Bagepalli et al. |
| 6,778,945 B2 | 8/2004 | Chassin et al. |
| 6,785,620 B2 | 8/2004 | Kishlock et al. |
| 6,972,660 B1 | 12/2005 | Montgomery, Jr. et al. |
| 7,020,508 B2 | 3/2006 | Stivoric et al. |
| 7,073,073 B1 | 7/2006 | Nonaka et al. |
| 7,073,075 B2 | 7/2006 | Freyman et al. |
| 7,136,710 B1 | 11/2006 | Hoffberg et al. |
| 7,142,949 B2 | 11/2006 | Brewster et al. |
| 7,149,727 B1 | 12/2006 | Nicholls et al. |
| 7,200,468 B2 | 4/2007 | Ruhnke et al. |
| 7,243,044 B2 | 7/2007 | McCalla |
| 7,333,880 B2 | 2/2008 | Brewster et al. |
| 7,356,548 B1 | 4/2008 | Culp et al. |
| 7,444,251 B2 | 10/2008 | Nikovski et al. |
| 7,460,502 B2 | 12/2008 | Arima et al. |
| 7,460,899 B2 | 12/2008 | Almen |
| 7,552,030 B2 | 6/2009 | Guralnik et al. |
| 7,561,977 B2 | 7/2009 | Horst et al. |
| D605,652 S | 12/2009 | Plaisted et al. |
| 7,878,890 B2 | 2/2011 | Toyohara et al. |
| 7,991,513 B2 | 8/2011 | Pitt |
| 8,065,098 B2 | 11/2011 | Gautam |
| 8,166,047 B1 | 4/2012 | Cohen et al. |
| D660,867 S | 5/2012 | Marchetti |
| 8,180,591 B2 | 5/2012 | Yuen et al. |
| D665,411 S | 8/2012 | Rai et al. |
| 8,239,178 B2 | 8/2012 | Gray et al. |
| D667,841 S | 9/2012 | Rai et al. |
| 8,260,468 B2 | 9/2012 | Ippolito et al. |
| 8,275,635 B2 | 9/2012 | Stivoric et al. |
| 8,280,536 B1 | 10/2012 | Fadell et al. |
| D671,550 S | 11/2012 | Chen et al. |
| 8,348,840 B2 | 1/2013 | Heit et al. |
| 8,375,118 B2 | 2/2013 | Hao et al. |
| 8,417,061 B2 | 4/2013 | Kennedy et al. |
| 8,428,785 B2 | 4/2013 | Boucher et al. |
| 8,429,630 B2 | 4/2013 | Nickolov et al. |
| 8,478,447 B2 | 7/2013 | Fadell et al. |
| 8,489,245 B2 | 7/2013 | Carrel et al. |
| D687,445 S | 8/2013 | Fuhrmann |
| 8,560,133 B2* | 10/2013 | Venkatakrishnan .. G06F 1/3203 700/275 |
| D694,252 S | 11/2013 | Helm |
| 8,583,288 B1 | 11/2013 | Rossi et al. |
| D697,526 S | 1/2014 | Bruck et al. |
| 8,630,741 B1 | 1/2014 | Matsuoka et al. |
| 8,660,813 B2 | 2/2014 | Curtis et al. |
| 8,674,816 B2* | 3/2014 | Trundle ............... F24F 11/0086 340/12.53 |
| D703,690 S | 4/2014 | MacCubbin et al. |
| 8,690,751 B2 | 4/2014 | Auphan |
| D707,245 S | 6/2014 | Bruck et al. |
| 8,751,432 B2 | 6/2014 | Berg-Sonne et al. |
| D710,871 S | 8/2014 | McCormack et al. |
| 8,805,000 B2 | 8/2014 | Derby et al. |
| 8,818,758 B1 | 8/2014 | Singh et al. |
| D714,335 S | 9/2014 | Cojuangco et al. |
| 8,832,106 B2* | 9/2014 | Kopp .................... G06Q 10/00 707/737 |
| 8,868,248 B2 | 10/2014 | Park |
| D717,328 S | 11/2014 | Lin |
| D720,767 S | 1/2015 | Miller et al. |
| 8,954,849 B2 | 2/2015 | Doi et al. |
| D725,133 S | 3/2015 | Smirin et al. |
| D725,664 S | 3/2015 | Nies et al. |
| D729,268 S | 5/2015 | Nies et al. |
| D730,386 S | 5/2015 | Ryan et al. |
| 9,031,703 B2 | 5/2015 | Nakamura et al. |
| D731,538 S | 6/2015 | Lee |
| D732,049 S | 6/2015 | Amin |
| D732,062 S | 6/2015 | Kwon |
| D740,847 S | 10/2015 | Yampolskiy et al. |
| 9,218,632 B2* | 12/2015 | Venkatakrishnan ... G06Q 50/06 |
| 2001/0047290 A1 | 11/2001 | Petras et al. |
| 2002/0065581 A1 | 5/2002 | Fasca |
| 2002/0178047 A1 | 11/2002 | Or et al. |
| 2002/0198629 A1 | 12/2002 | Ellis |
| 2003/0011486 A1 | 1/2003 | Ying |
| 2003/0018517 A1 | 1/2003 | Dull et al. |
| 2003/0023467 A1 | 1/2003 | Moldovan |
| 2003/0216971 A1 | 11/2003 | Sick et al. |
| 2004/0024717 A1 | 2/2004 | Sneeringer |
| 2004/0111410 A1 | 6/2004 | Burgoon et al. |
| 2004/0140908 A1 | 7/2004 | Gladwin et al. |
| 2005/0257540 A1 | 11/2005 | Choi et al. |
| 2006/0089851 A1 | 4/2006 | Silby et al. |
| 2006/0093222 A1 | 5/2006 | Saffer et al. |
| 2006/0103549 A1 | 5/2006 | Hunt et al. |
| 2006/0195438 A1 | 8/2006 | Galuten |
| 2006/0246968 A1 | 11/2006 | Dyke-Wells |
| 2007/0061735 A1 | 3/2007 | Hoffberg et al. |
| 2007/0185835 A1 | 8/2007 | Ursitti et al. |
| 2007/0198459 A1 | 8/2007 | Boone et al. |
| 2007/0203860 A1 | 8/2007 | Golden et al. |
| 2007/0213992 A1 | 9/2007 | Anderson et al. |
| 2007/0255457 A1 | 11/2007 | Whitcomb et al. |
| 2007/0260405 A1 | 11/2007 | McConnell et al. |
| 2008/0027885 A1 | 1/2008 | van Putten et al. |
| 2008/0033587 A1 | 2/2008 | Kurita et al. |
| 2008/0167535 A1 | 7/2008 | Stivoric et al. |
| 2008/0189632 A1 | 8/2008 | Tien et al. |
| 2008/0195561 A1 | 8/2008 | Herzig |
| 2008/0222561 A1 | 9/2008 | Helfman et al. |
| 2008/0244429 A1 | 10/2008 | Stading |
| 2008/0281473 A1 | 11/2008 | Pitt |
| 2008/0281763 A1 | 11/2008 | Yliniemi |
| 2008/0304112 A1 | 12/2008 | Matsuno |
| 2008/0306985 A1 | 12/2008 | Murray et al. |
| 2009/0106202 A1 | 4/2009 | Mizrahi |
| 2009/0106674 A1 | 4/2009 | Bray et al. |
| 2009/0187499 A1* | 7/2009 | Mulder .................. G05B 15/02 705/30 |
| 2009/0204267 A1 | 8/2009 | Sustaeta et al. |
| 2009/0217175 A1 | 8/2009 | Bechtel et al. |
| 2009/0217179 A1 | 8/2009 | Mons et al. |
| 2009/0326726 A1 | 12/2009 | Ippolito et al. |
| 2010/0025483 A1 | 2/2010 | Hoeynck et al. |
| 2010/0076835 A1 | 3/2010 | Silverman |
| 2010/0082174 A1 | 4/2010 | Weaver |
| 2010/0099954 A1 | 4/2010 | Dickinson et al. |
| 2010/0106575 A1 | 4/2010 | Bixby et al. |
| 2010/0138363 A1 | 6/2010 | Batterberry et al. |
| 2010/0156665 A1 | 6/2010 | Krzyzanowski et al. |
| 2010/0179704 A1 | 7/2010 | Ozog |
| 2010/0180223 A1 | 7/2010 | Speier |
| 2010/0198713 A1 | 8/2010 | Forbes, Jr. et al. |
| 2010/0217452 A1 | 8/2010 | McCord et al. |
| 2010/0217549 A1 | 8/2010 | Galvin et al. |
| 2010/0217550 A1 | 8/2010 | Crabtree et al. |
| 2010/0217642 A1 | 8/2010 | Crubtree et al. |
| 2010/0217651 A1 | 8/2010 | Crabtree et al. |
| 2010/0232671 A1 | 9/2010 | Dam et al. |
| 2010/0241648 A1 | 9/2010 | Ito et al. |

(56) References Cited

U.S. PATENT DOCUMENTS

| | | |
|---|---|---|
| 2010/0286937 A1 | 11/2010 | Hedley et al. |
| 2010/0289643 A1 | 11/2010 | Trundle et al. |
| 2010/0324962 A1 | 12/2010 | Nesler et al. |
| 2010/0332373 A1 | 12/2010 | Crabtree et al. |
| 2011/0022429 A1 | 1/2011 | Yates et al. |
| 2011/0023045 A1 | 1/2011 | Yates et al. |
| 2011/0040666 A1 | 2/2011 | Crabtree et al. |
| 2011/0061014 A1 | 3/2011 | Frader-Thompson et al. |
| 2011/0063126 A1 | 3/2011 | Kennedy et al. |
| 2011/0106316 A1 | 5/2011 | Drew et al. |
| 2011/0106328 A1 | 5/2011 | Zhou et al. |
| 2011/0106471 A1 | 5/2011 | Curtis et al. |
| 2011/0153102 A1 | 6/2011 | Tyagi et al. |
| 2011/0178842 A1 | 7/2011 | Rane et al. |
| 2011/0178937 A1 | 7/2011 | Bowman |
| 2011/0205245 A1 | 8/2011 | Kennedy et al. |
| 2011/0231320 A1 | 9/2011 | Irving |
| 2011/0251730 A1 | 10/2011 | Pitt |
| 2011/0251807 A1 | 10/2011 | Rada et al. |
| 2011/0282505 A1 | 11/2011 | Tomita et al. |
| 2011/0313964 A1 | 12/2011 | Sanchey Loureda et al. |
| 2012/0036250 A1 | 2/2012 | Vaswani et al. |
| 2012/0053740 A1 | 3/2012 | Venkatakrishnan et al. |
| 2012/0066168 A1 | 3/2012 | Fadell et al. |
| 2012/0078417 A1 | 3/2012 | Connell, II et al. |
| 2012/0084063 A1 | 4/2012 | Drees et al. |
| 2012/0179692 A1 | 7/2012 | Hsiao et al. |
| 2012/0215369 A1 | 8/2012 | Desai et al. |
| 2012/0216123 A1 | 8/2012 | Shklovskii et al. |
| 2012/0259678 A1 | 10/2012 | Overturf et al. |
| 2012/0290230 A1 | 11/2012 | Berges Gonzalez et al. |
| 2012/0310708 A1 | 12/2012 | Curtis et al. |
| 2013/0060531 A1 | 3/2013 | Burke et al. |
| 2013/0060720 A1 | 3/2013 | Burke |
| 2013/0097177 A1 | 4/2013 | Fan et al. |
| 2013/0097481 A1 | 4/2013 | Kotler et al. |
| 2013/0173064 A1 | 7/2013 | Fadell et al. |
| 2013/0253709 A1 | 9/2013 | Renggli et al. |
| 2013/0261799 A1 | 10/2013 | Kuhlmann et al. |
| 2013/0262040 A1 | 10/2013 | Buckley |
| 2014/0006314 A1 | 1/2014 | Yu et al. |
| 2014/0019319 A1 | 1/2014 | Derby et al. |
| 2014/0074300 A1 | 3/2014 | Shilts et al. |
| 2014/0096946 A1* | 4/2014 | Rognli .................. F24F 11/006 165/209 |
| 2014/0107850 A1 | 4/2014 | Curtis |
| 2014/0148706 A1 | 5/2014 | Van Treeck et al. |
| 2014/0163746 A1 | 6/2014 | Drew et al. |
| 2014/0207292 A1 | 7/2014 | Ramagem et al. |
| 2014/0266154 A1* | 9/2014 | Lavoie .................... G01D 4/00 324/105 |
| 2014/0337107 A1 | 11/2014 | Foster |
| 2014/0351018 A1* | 11/2014 | Feldman ............ G06Q 30/0204 705/7.33 |
| 2015/0227522 A1 | 8/2015 | O'Donnell et al. |
| 2015/0227846 A1 | 8/2015 | Mercer et al. |
| 2015/0254246 A1 | 9/2015 | Sheth et al. |
| 2015/0267935 A1 | 9/2015 | Devenish et al. |
| 2015/0269664 A1 | 9/2015 | Davidson |
| 2015/0300831 A1 | 10/2015 | Sernicola |
| 2015/0310019 A1 | 10/2015 | Royer et al. |
| 2015/0310463 A1 | 10/2015 | Turfboer et al. |
| 2015/0310465 A1 | 10/2015 | Chan et al. |
| 2015/0319119 A1 | 11/2015 | Ryu et al. |
| 2015/0324819 A1 | 11/2015 | Lin et al. |
| 2015/0326679 A1 | 11/2015 | Lin et al. |

FOREIGN PATENT DOCUMENTS

| | | |
|---|---|---|
| CA | 2832211 | 11/2012 |
| DE | 3703387 | 8/1987 |
| DE | 102011077522 | 12/2012 |
| EP | 0003010 | 7/1979 |
| EP | 2705440 | 3/2014 |
| EP | 2496991 | 9/2014 |
| GB | 1525656 | 9/1978 |
| GB | 2238405 | 5/1991 |
| JP | 2000-270379 | 9/2000 |
| JP | 2004-233118 | 8/2004 |
| JP | 2006-119931 | 5/2006 |
| JP | 2007-133468 | 5/2007 |
| JP | 2011-027305 | 2/2011 |
| JP | 2012-080679 | 4/2012 |
| JP | 2012-080681 | 4/2012 |
| JP | 2013-020307 | 1/2013 |
| WO | WO 03/102865 | 12/2003 |
| WO | WO 03/104941 | 12/2003 |
| WO | WO 2008/101248 | 8/2008 |
| WO | WO 2009/085610 | 7/2009 |
| WO | WO 2011/057072 | 5/2011 |
| WO | WO 2012/112358 | 8/2012 |
| WO | WO 2012/154566 | 11/2012 |
| WO | WO 2014/004148 | 1/2014 |
| WO | WO 2014/182656 | 11/2014 |

OTHER PUBLICATIONS

International Preliminary Report on Patentability for PCT Application No. PCT/US2010/055621, dated May 15, 2012, 8 pages.
International Search Report and Written Opinion for PCT Application No. PCT/US2010/055621, dated Dec. 23, 2010, 9 pages.
International Search Report and Written Opinion for PCT Application No. PCT/US2012/036539, dated Jul. 6, 2012, 8 pages.
International Preliminary Report on Patentability for PCT Application No. PCT/US2012/036539, dated Nov. 21, 2013, 7 pages.
International Search Report and Written Opinion for PCT Application No. PCT/US2013/046126, dated Aug. 22, 2013, 9 pages.
International Preliminary Report on Patentability for PCT Application No. PCT/US2013/046126, dated Jan. 8, 2015, 8 pages.
International Search Report for PCT Application No. PCT/US2014/036901, dated Aug. 28, 2014, 3 pages.
Patent Examination Report No. 1 for Australian Patent Application No. 2010315015, dated Dec. 17, 2013, 3 pages.
Extended European Search Report for European Patent Application No. 12782569.3, dated Nov. 27, 2014, 7 pages.
Aragon, Liz, "Black and White Emoticons," posted at Sweet Clip Art, posting date Apr. 29, 2012. © 2011 2015 Elizabeth J. Aragon, available at http://sweetclipart.com/blackandwhiteemoticons838>.
Author Unknown, "An Inconvenient Truth," Jan. 9, 2008, 2 pages, available at http://web.archive.org/web/2008019005509/http://www.climatecrisis.net/takeaction/carbonca/.
Author Unknown, "Calculate Your Impact," Jul. 28, 2008, 4 pages, available at http://web.archive.org/web/20080728161614/http://green.yahoo.com/calculator/.
Author Unknown, "Carbon Footprint Calculator: What's My Carbon Footprint?" The Nature Conservancy, Jul. 8, 2008, 8 pages, available at http://web.archive.org/web/20080708193253/http://www.nature.org/initiatives/climatechange/calculator/2008.
Author Unknown, "CoolClimate Calculator," May, 19, 2008, 15 pages, available at http://web.archive.orgl/web/20080519220643/ble.berkeley.edu/coolcalc/calculations.html.
Author Unknown, "Lifecycle Climate Footprint Calculator," Berkeley Institute of the Environment, Nov. 23, 2007, 6 pages, available at http://web.archive.org/web/20071123115832/http://ble.berkeley.edu/calculator.
Author Unknown, "More than just a thermostat.," http://www.ecobee.com/, 4 pages, Jul. 16, 2013.
Author Unknown, "Popups Climate Change: Carbon Calculator—Greenhouse Gas and Carbon Dioxide Calculator Wed Pages," The Nature Conservancy, 5 pages, Feb. 29, 2008, available at http://web.archive.org/web/20080229072420/www.nature.org/popups/rnisc/art20625.html.
Bailey, Timothy, et al., "Fitting a Mixture Model by Expectation Maximization to Discover Motifs in Biopolymers," UCSD Technical Report CS94-351, Proceedings of the Second International Conf. on Intelligent Systems for Molecular Biology, 1994, 33 pages.
Blaine, Joel, "Seven Cities and a Utility Company Team Up to Deliver Energy Savings," posted at Dept. Of Energy, posting date

(56) References Cited

OTHER PUBLICATIONS

Aug. 1, 2011, available at http://energy.gov/articles/sevencitiesandutilitycompanyteamdeliverresidentialenergysavings>.

Chen, Hanfeng, et al., "Testing for a Finite Mixture Model With Two Components," Journal of the Royal Statistical Society, Series B, vol. 66, No. 1, 26 pages, 2004.

De Prensa, Boletine, "TXU Energy Budget Alerts Give Consumers Control of Electricity Costs," TXU Energy, http://www.txu.com/es/about/press, 2 pages, May 23, 2012.

Deb, Partha, "Finite Mixture Models," Hunter College and the Graduate Center, CUNY NBER, FMM Slides, 42 pages, Jul. 2008.

D'Urso, M., et al., "A Simple Strategy for Life Signs Detection Via an X-Band Experimental Set-Up," Progress in Electromagnectics Research C, vol. 9, pp. 119-129 (2009).

Eckmann, J.P., et al., "Ergodic theory of chaos and strange attractors," Reviews of Modern Physics, vol. 57, No. 3, Part I, pp. 617-656, Jul. 1985.

Espinoza, Marcelo, et al., "Short-Term Load Forecasting, Profile Identification, and Customer Segmentation: A Methodology Based on Periodic Time Series," IEEE Transactions on Power Systems, vol. 20, No. 3, pp. 1622-1630, Aug. 2005.

Fels, Margaret F., "PRISM: An Introduction," Elsevier Sequoia, Energy and Buildings, vol. 9, pp. 5-18, 1986.

Fels, Margaret F., et al., Seasonality of Non-heating Consumption and Its effect on PRISM Results, Elsevier Sequoia, Energy and Buildings, vol. 9, pp. 139-148, 1986.

Figueiredo, Vera, et al., "An Electric Energy Consumer Characterization Framework Based on Data Mining Techniques," IEEE Transactions on Power Systems, vol. 20, No. 2, pp. 596-602, May 2005.

Fitbit® Official Site, "Flex, One & Zip Wireless Activity & Sleep Trackers," http://www.fitbit.com/, 4 pages, Jul. 15, 2013.

Freepik, Surprised emoticon square face with open eyes and mouth, posted at Flat Icon, posting date not given. © 2013-2015 Graphic Resources SL, available at http://www.flaticon.com/freeicon/surprisedemoticonsquarefacewithopeneyesandmouth_ 42835>.

Friedman, Jerome, et al., "Regularization Paths for Generalized Linear Models via Coordinate Descent," Journal of Statistical Sotfware, vol. 33, Iss. 1, pp. 1-22, Jan. 2010.

Gelber, Bob, "This Is Not a Bill," posted at Not a Mystery, posting date 4/1812015, available at http://notamystery.com/2015/04/18/not_worth_the_papeUts_printed_on/>.

Goldberg, Miriam L., et al., "Refraction of PRISM Results into Components of Saved Energy," Elsevier Sequoia, Energy and Buildings, vol. 9, pp. 169-180, 1986.

Jansen, R.C., "Maximum Likelihood in a Generalized Linear Finite Mixture Model by Using the EM Algorithm," Biometrics, vol. 49, pp. 227-231, Mar. 1993.

Jawbone, "Know yourself. Live better." https://jawbone.com/up/, 7 pages, Jul. 15, 2013.

Karsten, "Green nudge: The classic social comparison experiment by Opower," posted at iNudgeyou, posting date Nov. 28, 2012, available at http://inudgeyou.com/greennudgetheclassicsocialcomparisonexperimenbyopower/>.

Laskey, Alex, et al., "OPOWER," posted at ACM, posting date Jun. 2011, Copyright © 2015 by the ACM, available at http://xrds.acm.org/article.cfm?aid=1961687>.

Leisch, Friedrich, "FlexMix: A General Framework for Finite Mixture Models and Latent Class Regression in R," Journal of Statistical Software, http://www.istatsoft.org/, vol. 11 (8), pp. 1-18, Oct. 2004.

Liang, Jian, et al. "Load Signature Study-Part II: Disaggregation Framework, Simulation, and Applications," IEEE Transactions on Power Delivery, vol. 25, No. 2, pp. 561-569, Apr. 2010.

Liang, Jian, et al., "Load Signature Study—Part I: Basic Concept, Structure, and Methodology," IEEE Transactions on Power Delivery, vol. 25, No. 2, pp. 551-560, Apr. 2010.

Marshall, Jonathan, "PG&E Home Energy Reports Stimulate Big Customer Savings," posted at PG&E Currents, posting date May 14, 2014, © 2014 Pacific Gas and Electric Company, available at http://www.pgecurrents.com/2014/05/14/pgehomeenergyreports-stimulatebigcustomersavings/>.

Mint.com, "Budgets you'll actually stick to," Budgeting-Calculate and Categorize your spending, https://www.mint.com/how-it-works/budgeting/, 2 pages, Jul. 12, 2013.

Mint.com, "We're always on alert." Alerts for bills, fees & going over budget, https://www.mint.com/how-it-works/alerts/, 2 pages, Jul. 12, 2013.

Morabito, Kerri, "High User Campaign," posted at Kerri Morabito, posting date not given, © Kerri Morabito, 2015, available at <URL: http://www.kerrimorabito.com/high-user-campaign.html>.

Mori, Hiroyuki, "State-of-the-Art Overview on Data Mining in Power Systems," IEEE, pp. 33-37, 2006.

Muthen, Bengt, et al., Finite Mixture Modeling with Mixture Outcomes Using the EM Algorithm, Biometrics, vol. 55, pp. 463-469, Jun. 1999.

Nest, "The Learning Thermostat," http://www.nest.com/, 2 pages, Jul. 15, 2013.

Nike.com, "Nike + FuelBand. Tracks your all-day activity and helps you do more . . . ," http://www.nike.com/us/en_us/c/nikeplus-f..uelband, 7 pages, Jul. 15, 2013.

Rocheleau, Jake, "38 Amazingly Well-Designed Emoji Iconsets," posted at SpyreStudios, posting date Mar. 25, 2015, SpyreStudios © 2015, available at http://spyrestudios.com/38welldesignedemojiconsets/>.

Rose, O. "Estimation of the Hurst Parameter of Long-Range Dependent Time Series," University of Wuirzburg, Institute of Computer Science, Research Report Series, Report No. 137, 15 pages, Feb. 1996.

Sawka, Michael N., et al., "Human Adaptations to Heat and Cold Stress," RTOMP-076, 16 pages, Oct. 2001.

Stephen, Bruce, et al. "Domestic Load Characterization Through Smart Meter Advance Stratification," IEEE Transactions on Smart Grid, Power Engineering Letter, vol. 3, No. 3, pp. 1571-1572, Sep. 2012.

Stoop, R., et al., "Calculation of Lyapunov exponents avoiding spurious elements," Physica D 50, pp. 89-94, May 1991.

Wang, Xiaozhe, et al. "Rule induction for forecasting method selection: meta-learning the characteristics of univariate time series," Faculty of information Technology, Department of Econometrics and Business Statistics, Monash University, pp. 1-34.

Wang, Xiaozhe, et al., "Characteristic-Based Clustering for Time Series Data," Data Mining and Knowledge Discovery, Springer Science & Business Media, LLC, vol. 13, pp. 335-364 (2006).

Wehrens, Ron, et al. "Self- and Super-organizing Maps in R: The kohonen Package," Journal of Statistical Software, vol. 21, Iss. 5, pp. 1-19, Oct. 2007.

Wikipedia, "Akaike information criterion," 6 pages, Aug. 17, 2012.

Wikipedia, "Mixture model," 10 pages, Oct. 7, 2012.

\* cited by examiner

DEMAND RESPONSE DEVICE CONFIGURED TO PROVIDE COMPARATIVE CONSUMPTION INFORMATION RELATING TO PROXIMATE USERS OR CONSUMERS

CROSS-REFERENCE TO RELATED APPLICATIONS

This application claims the benefit of priority to U.S. Provisional Application Ser. No. 62/079,510, filed Nov. 13, 2014, entitled "DEMAND RESPONSE DEVICE," which is hereby incorporated by reference in its entirety.

BACKGROUND

Technical Field

Aspects of this disclosure relate to systems for providing demand response data to resource users/customers, and in particular, aspects of the technology relate to a demand response device configured to provide comparative consumption information relating to proximate users or consumers.

Introduction

Peak resource consumption events or "peak events" can occur multiple times per year for a given resource (e.g., electricity, gas, and/or water). For example, a peak event for a utility may occur during one or more hot days due to heavy air-conditioning loads, or on one or more cold days, for example, due to a high energy demand imposed by heating systems. During a peak event, a resource provider (e.g., a utility company) may have difficulty meeting resource demand, which can result in blackouts, utility rate hikes, and/or a need to put additional electric generators online.

SUMMARY

The following presents a simplified summary of one or more embodiments in order to provide a basic understanding of such embodiments. This summary is not an extensive overview of all contemplated embodiments, and is therefore not intended to identify key or critical elements of all embodiments nor delineate the scope of any or all aspects of the invention. Its sole purpose is to present some concepts of one or more embodiments in a simplified form as a prelude to a more detailed description, presented later.

In one aspect, a demand response device is provided that includes a microprocessor that is coupled to a location module, one or more environmental sensor/s, and a network interface. The microprocessor can be configured to correlate ambient temperature information received from the one or more environmental sensors with position/location data provided by the location module. In some aspects, the microprocessor can be further configured to perform operations including sending, via the network interface, a temperature report to a remote service, wherein the temperature report comprises the ambient temperature information and location data, and receiving, via the network interface, a comparison report from the remote service, wherein the comparison report includes comparative environmental setting information for one or more proximately located demand response devices.

In another aspect, the subject technology relates to a notification system configured for generating comparison reports for one or more demand response devices. In some implementations, the notification system can include one or more processors, and a computer-readable medium including instructions stored therein, which when executed by the processors, cause the processors to perform operations including: receiving at least one temperature report for each of a plurality of demand response devices, wherein each of the temperature reports includes ambient temperature information and geolocation data for a respective one of the plurality of demand response devices, and identifying two or more demand response devices that share a common geographic location. In some approaches, the processors can be further configured to perform operations for generating a comparison report, wherein the comparison report is based on the ambient temperature information and the geolocation data for at least two of the plurality of demand response devices.

In yet another implementation, the technology can relate to a non-transitory computer-readable storage medium comprising instructions stored therein, which when executed by one or more processors, cause the processors to perform operations including receiving at least one temperature report for each of a plurality of demand response devices, and identifying two or more demand response devices that share a common geographic location. Depending on implementation, the instructions can further include generating a comparison report for at least two of the plurality of demand response devices.

BRIEF DESCRIPTION OF THE DRAWINGS

In the following description, reference is made to the following figures, and in which are shown by way of illustration specific examples in which the subject technology may be practiced. It is to be understood that other aspects may be utilized and changes made without departing from the scope of the subject technology.

DETAILED DESCRIPTION

Figure 1:
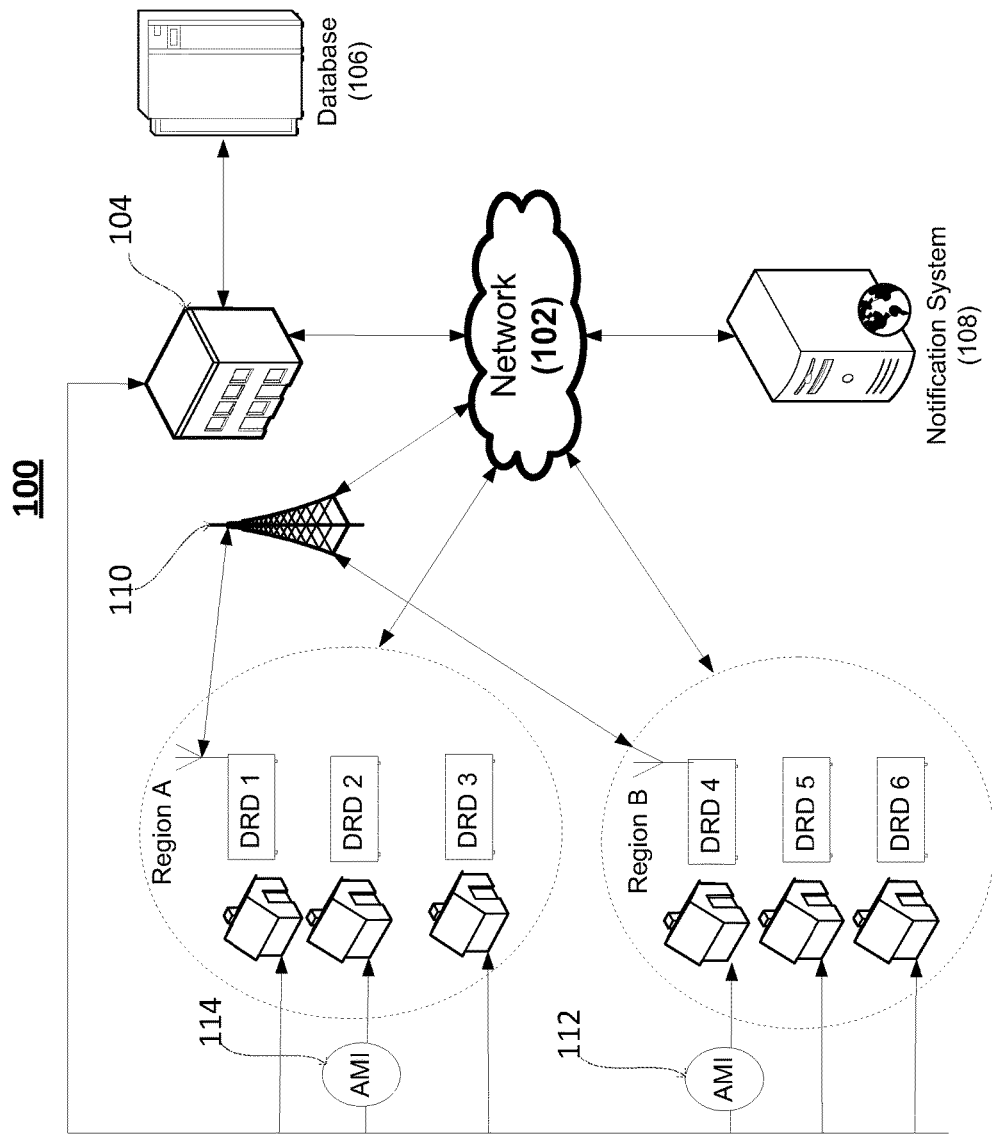
FIG. 1 illustrates an example environment in which a demand response device is implemented, according to some aspects of the technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

In some aspects, the problems caused by peak resource consumption periods can be addressed by implementing systems that enable resource providers to initiate a demand response event to curtail resource demand. As used herein a "demand response event" can refer to actions taken to reduce resource demand at a chosen time, such as before (or during) a peak consumption period. A demand response event can involve implementing a demand response campaign or program, for example, in which communications are delivered to individual consumers or customers (e.g., via electronic mail, regular mail, etc.) before, or during, the peak event. In such instances, the communications can be designed to induce the customers to perform certain actions or behaviors that reduce resource consumption. In such instances, these communications may be referred to as behavioral demand response (BDR) communications or BDR notifications. In some BDR implementations, BDR notifications inform the audience customer of the upcoming peak event and indicate actions that the consumer can take to reduce his/her resource usage, for example, before or during the peak period. In some implementations, BDR customers are provided with post-event notifications to provide feedback regarding resource conservation during the peak event period, for example, as compared to a previous peak event and/or other customers, etc.

Some behavioral demand response (BDR) methodologies are implemented by collecting historic use data for a particular resource (such as electric power load curve data or AMI data), and providing reduction notifications before the predicted occurrence of a peak event. While advanced notifications can help reduce resource consumption, such methodologies rely on the collection and analysis of historic use information, for example, to accurately forecast peak events, as well as to determine if a particular user should be provided with a reduction notification.

In power management strategies that do not utilize a BDR system, "smart thermostats" have been used to help users implement heating/cooling programs in their homes. However, smart thermostats (e.g., that include Wi-Fi capabilities) can be cost prohibitive to many potential customers, and can require more expensive metering infrastructure, such as Advanced Metering Infrastructure (AMI).

The subject technology addresses some limitations in providing advanced BDR dispatch notifications by providing a demand response device (DRD) configured to deliver real-time targeted notifications that includes neighbor comparison information. In comparison to more expensive smart thermostat devices, DRDs of the subject technology can implement BDR notification delivery, without the need costly networking componentry or AMI metering devices. However, in some aspects, a DRD of the subject technology can be configured for bi-directional communication, for example, to transmit location and temperature information to a remote notification system, and for receiving real-time demand response notifications prepared for delivery to a user associated with the DRD. By providing real-time demand response notifications, relevant reduction notification alerts can be provided in quick response to detected high-power loads, or large disparities in power consumption by similarly situated customers, thus helping to alleviate reliance on peak event forecasting and increasing accuracy/relevance of notification content.

A demand response device can include hardware and/or software modules necessary to collect and transmit location and temperature information, for example, to one or more remote servers or systems (e.g., a BRD notification system) for further processing. For example, a DRD can include a location module for determining a geographic position of the device, such as, a global positioning system (GPS) module. The DRD can also include one or more environmental sensors for measuring and/or recording environmental information for the location in which the device is located. In some approaches, a DRD can include a temperature sensor for measuring and correlating temperature and position information, which can be communicated to a remote location (e.g., one or more remote servers) for processing.

By comparing location and temperature information aggregated for multiple demand response devices (e.g., using one or more remote systems/servers) a determination can be made as to whether targeted user notifications should be dispatched to any (or all of) the participating DRDs. By way of example, temperature information for devices proximately located to one another can be compared to determine if a thermostat setting for a location associated with a particular device should be adjusted in order to reduce power demand. In some implementations, demand reduction notifications can account for local or regional temperatures or weather conditions. That is, greater temperature variance between proximate devices may be accepted in extremely hot (or cold) climates, as compared with more temperate climates, before reduction notifications are sent. An amount of accepted temperature disparity between devices before a notification is triggered, may be a user configurable parameter, or determined by a controlling entity, such as an administrator or party responsible for maintaining the issuing BDR notification system. By taking environmental measurements (e.g., temperature/humidity readings), a DRD of the subject disclosure can provide advantages over smart thermostat devices, for example, that implement cooling/heating programs based on a thermostat set point.

FIG. 1 illustrates an example environment 100 in which various demand response devices can be implemented. Environment 100 includes network 102 that is configured to provide a communicative coupling between utility 104, notification system 108, wireless network 110, and each of multiple demand response devices, e.g., DRDs 1-3 in Region A and DRDs 4-6 in Region B. As further illustrated, utility 104 includes a utility database (i.e., database 106). Similarly, DRD 2 and DRD4 are paired with homes associated with an advanced metering infrastructure (AMI) meter, i.e., AMI 114 and AMI 112, respectively.

It is understood that network 102 can represent multiple interconnected networks, such as the Internet, which can include one or more wide area networks (WANs), local area networks (LANS), and/or a publicly switched telephone network (PSTN). Similarly, wireless network 110 may include a variety of public and/or privately administered wireless networks, such as a one or more cellular network/s, and/or ad hoc WiFi networks, or the like. Additionally, in the example depicted by FIG. 1, utility 104 is a power utility (i.e., and electric power provided), however, it is understood that utility 104 may represent a provider of any consumable resource, including but not limited to: gas, water, and/or electricity, etc.

In environment 100, each DRD is associated with a different customer location (e.g., customer residence), however, DRDs may be implemented in non-residential environments and therefore associated with any location where a consumable resource is provided and/or consumed. For example, DRDs can be implemented at business locations, schools, and/or industrial facilities, etc. Because each DRD is associated with a location where power is delivered, each DRD can correspond with a unique physical location or position. However, as discussed in further detail below, two or more DRDs may be determined to be located proximate to one another, sharing a similar geographic region or maximal radial distance between them. In the example of environment 100, DRDs 1-3 are physically placed at different locations in a common geographic area, i.e., "Region A." Similarly, DRDs 4-6 each share a common vicinity, i.e., "Region B."

Determinations as to when different demand response devices are considered to be "proximately located" can depend on a variety of factors. In some approaches, two or more DRDs (e.g., DRD 1 and DRD 3) may be considered to be proximately located to one another when sharing a common officially designated geo-political region, such as a common township, postal code, zip code, neighborhood or borough, etc. In another approach, proximity between DRDs is assessed based on a radial distance between them, for example, that is determined using corresponding geolocation information.

By way of example, two DRDs may be determined to be proximately located if the radius between them is below a predetermined threshold distance, for example, as determined based on their respective geolocation position system (GPS) coordinate information. Such thresholds can be configurable (e.g., by a user or system administrator) and may depend on a variety of factors, including but not limited to: demand response device density for a particular area, topographic considerations, weather considerations, and/or demographic considerations for one or more DRD users/owners.

Further to the example illustrated by environment 100, resource consumption information (e.g., power consumption) for each of a number of utility customers can be collected by utility 104 and stored in database 106. Alternatively, power consumption information may be collected for a particular customer using an associated AMI device (or other metering device). For example, consumption information for a consumer/customer corresponding with a location associated with DRD 2 may be collected from AMI 114. AMI data may be received by a BDR notification system, such as notification system 108, directly from an AMI device, for example via network 102 and/or wireless network 110. In another example, power consumption data such as load curve data and/or AMI data for one or more utility customers may be received by notification system 108 from a utility, e.g., utility 104.

In practice, each of DRDs 1-6 are configured to collect environmental information for a surrounding area of the respective device. Different types of environmental information can be collected, including one or more of: location information, temperature, and/or humidity. In some aspects, environmental information may also include data provided by one or more motion sensors, e.g., that may indicate an occupancy status of a particular location. Collected information can be forwarded to a remote service, such as notification system 108, for example, to determine if there are significant variations in temperature conditions as between proximately located DRD devices, and consequently whether or not notifications should be delivered to any of the DRDs.

Because proximately located DRDs (e.g., DRD 1 and DRD 2) are more likely to share similar environmental characteristics, such as temperature and humidity (as compared to devices in different region, such as DRD 5), the environmental information reported by DRDs 1 and 2 can be used to compare relative thermostat settings in those locations. By way of example, outdoor weather conditions may be hot in geographic Region A (shared by DRD 1 and DRD 2), however, collected environmental information for DRD 1 and DRD 2 may be quite different, possibly indicating different thermostat settings in the corresponding homes. That is, relatively hot outdoor conditions in Region A (e.g., 85° F.), may cause a user of DRD 1 to set his thermostat at 80° F., whereas a user of DRD 2 may set his thermostat at 70° F. In the foregoing example, DRDs 1 and 2, although sharing a common geographic region, would collect and report different environmental information.

As in the above example, environmental information collected by different (but proximately located) DRDs can be used by notification system 108 to determine which DRD devices are associated with a user that may be well positioned to take a resource conservation action, for example, by modifying his/her thermostat setting. Once identified, notification system 108 can send resource efficiency notifications (e.g., "comparison reports") directly to any chosen DRD, where the notifications can then be provided to an associated user. Further to the above example, if notification system 108 determines that a user associated with DRD 2 could raise his/her thermostat setting to conserve power, a notification can be provided to DRD 2, for example, suggesting that a thermostat setting for the associated residence be raised to 80° F. Because notification system 108 is provided with location information for each DRD, the DRD notifications can also indicate targeted suggestions that incorporate comparison information for nearby or neighboring DRD devices.

By way of further example, one or more notifications provided to DRD 2 can indicate that thermostat settings for a nearby residence (e.g., for user of DRD 1) are set to a higher temperature, and therefore better calibrated for conserving power in the hot climate condition. Alternatively, since the DRDs are configured to measure the environmental conditions inside a customer location, one or more notifications provided to DRD 2 can indicate the environmental conditions (e.g., temperature and/or humidity) experienced by other nearby customers (e.g., an average temperature experienced by nearby customers). Similar recommendations can be made in cold weather conditions as well. For example, if an ambient outdoor temperature in Region B is 15° F., one or more of DRDs 4-6 may be provided with notifications to indicate that lower temperature thermostat settings are preferred, e.g., where lower heat settings translate into a reduction in energy consumption. Methods by which particular DRDs are identified for notification delivery, as well as the selection of notification content, is discussed in further detail with respect to FIGS. 3 and 4, below.

Figure 2:
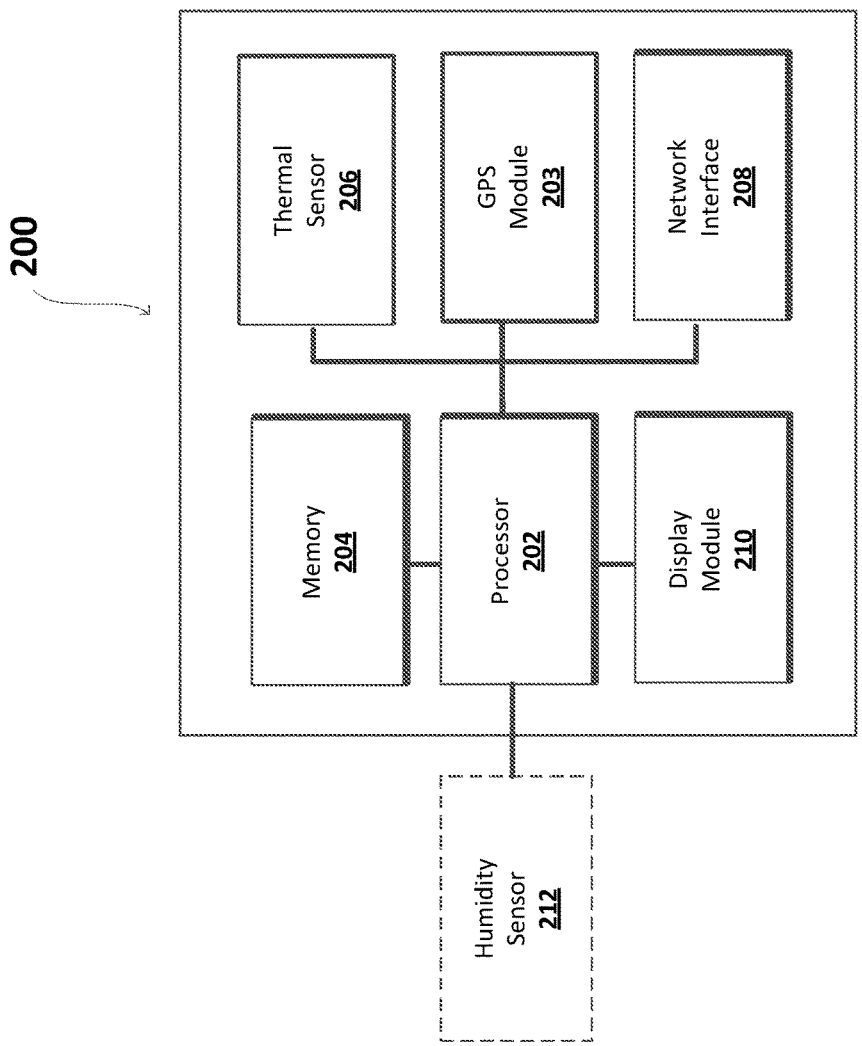
FIG. 2 is a conceptual block diagram of example hardware modules used to implement a demand response device, according to some aspects to the technology.

FIG. 2 provides an example block diagram of various hardware modules that can be used to implement demand response device 200, according to some aspects of the invention. DRD 200 includes processor 202 that is communicatively coupled to a variety of hardware components, including GPS module 203, memory 204, thermal sensor (e.g., thermometer) 206, network interface 208, display module 210, and optionally a humidity sensor 212. Although the example DRD 200 is illustrated with all hardware modules (except humidity sensor 212) in a common housing, other configurations are possible without departing from the scope of the technology. Furthermore, additional (or fewer) hardware modules may be used, depending on the desired implementation.

In practice, GPS module 203 is configured to detect a location of DRD 200. Similarly, thermal sensor 206 (e.g., a thermometer) and/or humidity sensor 212 (e.g., a hygrometer) can measure environmental characteristics such as temperature and/or humidity around the location of DRD 200. Environmental and/or position information can be measured periodically, e.g., at regular time intervals and stored onto a memory of DRD 200, such as memory 204.

Although DRD 200 specifically illustrates the use of GPS module 203, as well as thermal sensor 206 and humidity sensor 212, other hardware modules may be implemented that provide similar or expanded functionality. For example, in addition to (or in place of), GPS module 203, other location modules can be used for determining a relative location of DRD 200 with respect to one or more other DRD devices. Similarly, other types of environmental sensors may be used with (or in place of) thermal sensor 206 and/or humidity sensor 212. In one variation, a location module may be configured to receive location input (e.g., an address, a city zip code, or location coordinates) from a user, a utility, or a notification system. Additionally, the thermal sensor 206 or other environmental sensors may be configured to interface with a thermostat device at the customer location to receive environmental information (e.g., temperature, thermostat set points, etc.).

Once environmental and position information has been collected, the information can be transmitted to a remote service or device, e.g., via network interface 208. Although network interface 208 can be configured to communicate directly with a remote service via a network (e.g., the Internet), in some aspects network interface 208 is configured to route communications through an intermediary host device, such as a smart phone or tablet computing device, for example, to facilitate transmission of environmental and/or location information to a remote service. In such implementations, the host device (e.g., smartphone, personal computer, etc.) can receive short distance communications from the DRD, before relaying the same to a remote service, such as a notification system. As such, network interface 208 can include one or more communication modules, such as a network interface card (NIC), a WiFi chipset, near-field communication (NFC) interface, a Bluetooth® device, a GSM chipset, or the like.

After location and/or environmental information is transmitted to a remote service, such as notification system 108, network interface 208 can be used to receive communications, such as targeted notifications providing information as to how resource consumption can be reduced.

By way of example, BDR notifications received by DRD 200 can be provided or displayed to an associated user (e.g., via display module 210), for example, to instruct the user about actions that can reduce resource consumption (e.g., actions for reducing electric power usage). It is understood that display module 210 can include a variety of display devices or communication modules, including one or more indicator lights, such as, light-emitting diodes (LEDs). In some aspects, display module 210 may include a monochromatic or color display screen, such as a capacitive touch screen and/or a speaker audible communications or alerts. In yet another implementation, display module 210 may include drivers and/or circuitry necessary to facilitate the display of information on a third party device, such as a smart phone, tablet computing device, or personal computer PC.

In implementations wherein a DRD device is associated with an online customer account, notification delivery may be accomplished through a dispatch provided to customer device other than a DRD, such as a personal computing device (PC) or mobile device, such as a smart phone or tablet computer. For example, a notification system may be configured to provide alerts/notifications via email, text message (e.g., short messaging service), interactive voice response (IVR) and/or via a social networking platform, etc.

Figure 3:
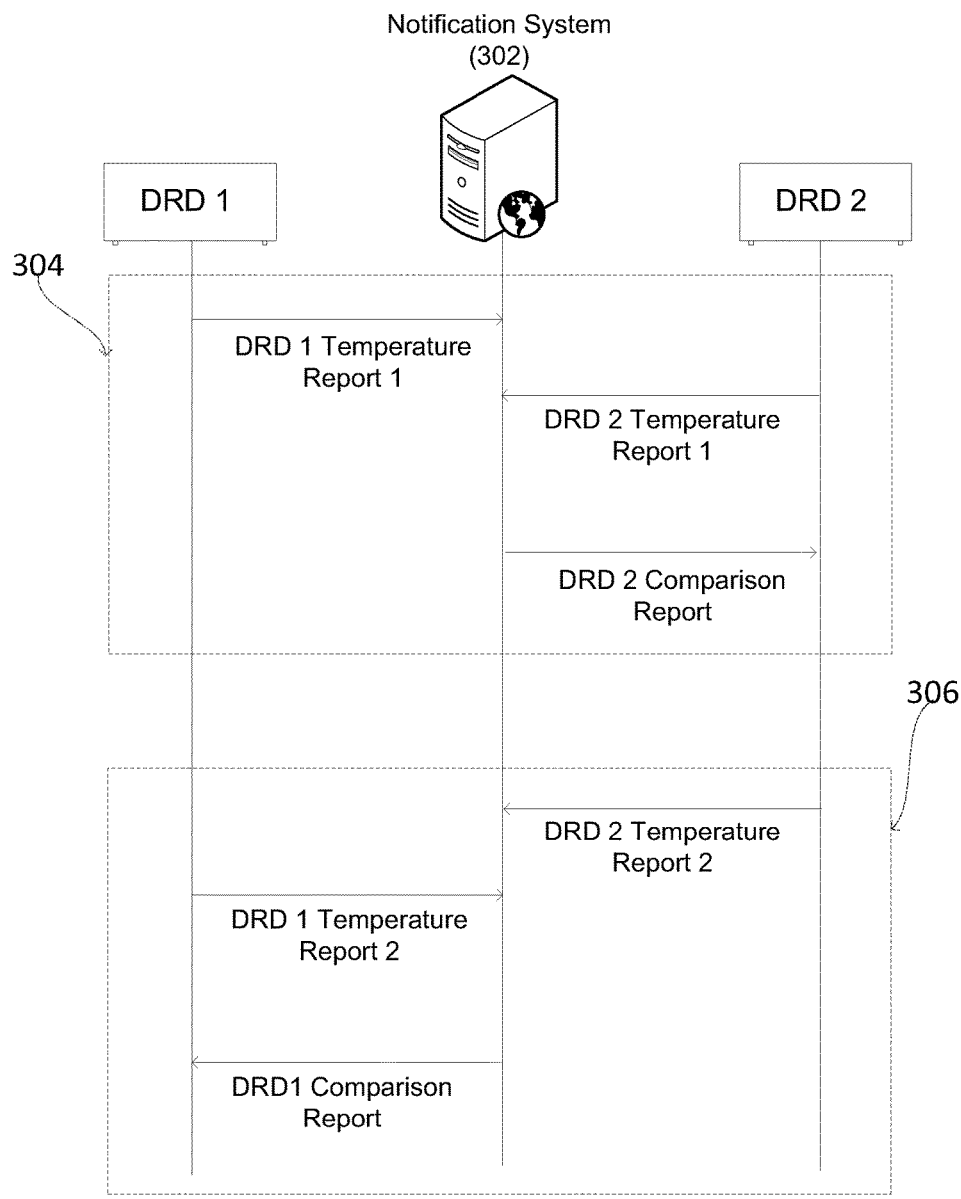
FIG. 3 provides a signal diagram conceptually illustrating information exchange between different various demand response devices and a notification system, according to some implementations.

FIG. 3 provides a signal diagram illustrating an example of information exchanged between different demand response devices (e.g., DRD 1 and DRD 2) and a notification system (e.g., notification system 302). Similar to the example discussed above with respect to environment 100, DRD 1 and DRD 2 each represent demand response devices at different locations, e.g., at a different customer residence locations, that share a common geographic region. In the example of FIG. 3, communications between each DRD device and notification system 302 are grouped into first correspondence set 304 and second correspondence set 306.

First correspondence set 304 includes a communication from DRD 1 to notification system 302, i.e., DRD 1 temperature report 1. Although DRD 1 temperature report 1 can contain different types of information, in one exemplary embodiment, the report contains location information identifying a location of DRD 1, as well as ambient temperature information to indicate environmental conditions (i.e., temperature) of the environs at that location. In some aspects, environmental conditions may be used to infer thermostat settings for the respective location. First correspondence set 304 also includes DRD 2 temperature report 1, which is provided from DRD 2 to notification system 302. Similarly, DRD 2 temperature report 1 can contain location information for DRD 2, as well as ambient temperature information for a location associated with DRD 2.

By way of example, DRD 1 may be placed in a business location proximate to another business location containing DRD 2. As such, DRD 1 temperature report 1 and DRD 2 temperature report 1 can be used (e.g., by notification system 302), to make relative temperature comparisons of businesses associated with DRD 1 and DRD 2, respectively. In instances wherein respective thermostat settings are inferred from corresponding temperature information, such comparative thermostat setting information may indicate differences between possible thermostat set-points as between two or more locations.

Because location information provided by one or both of DRD 1 and/or DRD 2, may be used to determine weather conditions for those locations (e.g., using a third party weather service), a difference between an ambient internal temperature (i.e., inside the business location) and the outdoor weather conditions can be determined. Similarly, differences between internal temperatures at each business location can be determined by notification system 302. As such, notifications provided to a particular DRD by notification system 302 can include comparative information for another DRD.

In the example of first correspondence set 304, once notification system 302 has received both temperature reports (e.g., DRD 1 temperature report 1 and DRD 2 temperature report 1), a comparison report, (e.g., DRD 2 comparison report), is sent to DRD 2. Although the comparison report can contain different types of data or instructions (such as how greater power conservation may be achieved at a location of DRD 2), in some aspects, comparative information is provided, for example, indicating temperature or thermostat characteristics of DRD 1.

In some aspects, comparison report information is sanitized of identifying information for the DRDs for which environmental comparisons are made. In this way, although notification system 302 receives location information for each reporting demand response device, the determination of which DRDs are considered to be "neighbors" is performed remotely by notification system 302, without the need for providing sensitive or private information to any DRD receiving a comparison report.

An additional DRD/notification system exchange is illustrated with respect to second communication set 306. In this communication set, DRD 2 first provides a temperature report to notification system 302 (e.g., DRD 2 temperature report 2). Subsequently, notification system 302 receives a temperature report from DRD 1 (e.g., DRD 1 temperature report 2). Based on the received temperature reports, notification system 302 issues DRD 1 comparison report to DRD 1, for example, indicating comparative environmental conditions based on temperature/humidity readings collected by DRD 2. As discussed above, although information included in DRD 1 comparison report may include relative thermostat or environmental reading information regarding a location of DRD 2, any identifying information (e.g., device identification or location information) is omitted.

It is understood that DRD notifications (e.g., DRD 1 comparison report and/or DRD 2 comparison report) can contain other types of information, such as suggestions or instructions, for user behaviors that can be performed to further consume resources (e.g., electric power).

In some aspects, notifications that are provided to a user (e.g., via a DRD display module) may be more effective when including comparative information regarding behaviors of similarly situated users, such as nearby DRD users. Additionally, because DRD communications can be issued from notification system 302 whenever comparative information becomes available about other DRDs, the DRD communications do not need to rely solely on projections derived from historic power load curve information. That is, notification system 302 can identify one or more DRD devices, and deliver notifications to those identified devices without the need to forecast a peak consumption event. In this manner, use of DRDs enables real-time BDR notifications to be delivered to select devices that also incorporate relevant and up-to-date comparison information relating to other nearby users.

An additional advantage of the DRD communication implementation described above is that each user's privacy can be protected through the obfuscation of location information (or usage information) by notification system 302. That is, although notification system 302 may receive location and/or usage information associated with a particular DRD, comparison reports provided by notification system 302 can be sanitized to remove any personally identifying information for neighboring devices.

Figure 4:
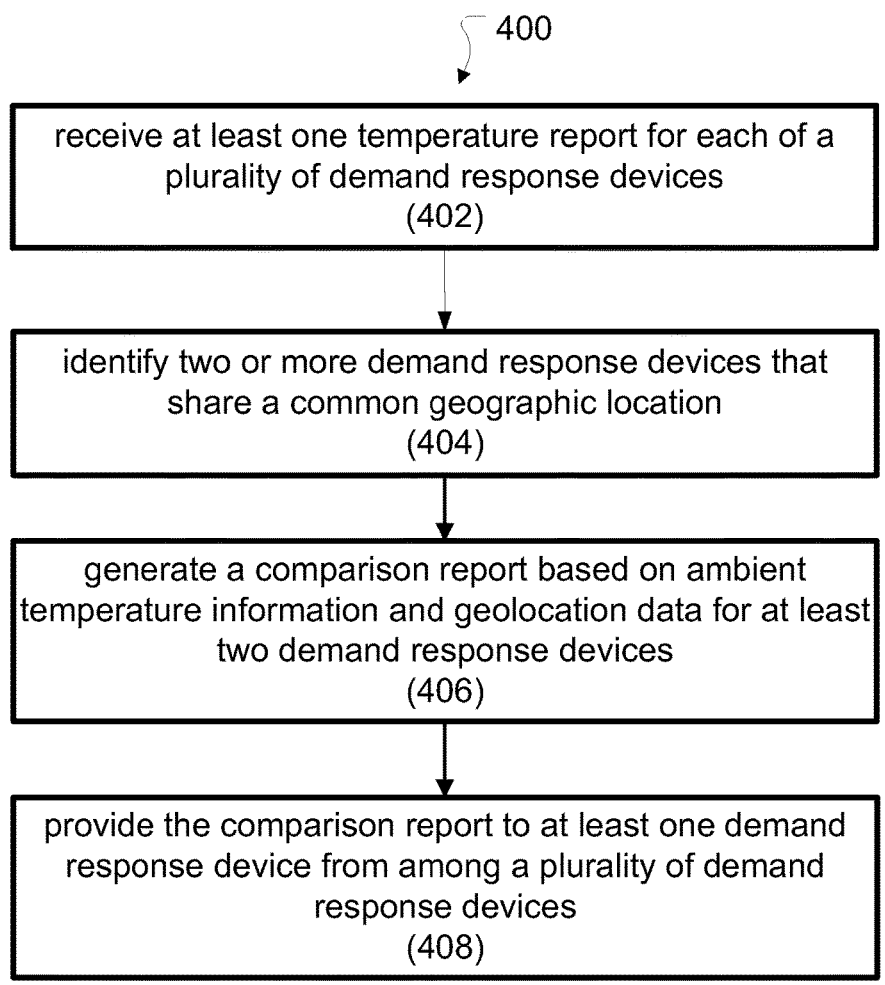
FIG. 4 is a flow diagram illustrating an example process for two or more demand response devices sharing a common geographic region, according to some aspects.

FIG. 4 illustrates a flowchart of an example process 400 that can be performed (e.g., by a notification system) for comparing environmental data collected by two or more DRDs. Process 400 begins with step 402 in which at least one temperature report for each of a plurality of DRDs is received by a notification system (e.g., notification system 302). Each received temperature report can contain information pertaining to a variety of environmental measurements taken at a location of the reporting DRD. As discussed above, temperature reports can contain one or more of: location information for a respective DRD, one or more temperature measurements taken at the reporting DRD location, and/or one or more humidity measurements taken at the reporting DRD, etc.

In an alternative implementation, process 400 may begin with the receipt (e.g., by a DRD) of a signal provided by a resource/utility provider, for example, to begin/trigger the delivery of one or more notifications to the DRD. In this manner, a utility or resource provider can initiate BDR notification delivery via one or more DRDs, and in some instances may also halt notification delivery.

In step 404, two or more DRDs are identified that share a common geographic location or region. That is, a determination is made as to which DRDs are considered to be closely or proximately located to one another. Determinations of DRD proximity can be performed in different ways and may depend on different factors. By way of example, geolocation information for each DRD can be used to calculate a radial distance between devices, wherein different devices may be determined to be proximately located if the intervening distance is below a predetermined threshold. In one approach, two or more devices may be considered to be "neighbors" if the distance between them is less than about three miles. In another example, one or more devices may be considered neighboring devices if the radial distance between them is less than ten miles. In yet another example, device grouping may occur if a radial distance is less than about one-hundred miles. In still another example, the system may use one distance (e.g., three miles as a default distance) for identifying neighboring device. However, if a threshold number of neighboring devices are not found, the system may switch to another distance (e.g., ten miles) and determine whether the threshold number of neighboring devices are found.

In another embodiment, DRD distance with respect to a predetermined location may be used to identify two or more DRDs considered to be proximately located. In yet another aspect, a neighbors determination can be based on factors other than device proximity. For example, a determination of neighboring devices (e.g., the grouping of two or more DRD devices) can depend on a variety of factors that indicate similarity (or dissimilarity) between two or more DRD device locations or associated users. For example, information about residence size, historic resource consumption, or occupant related demographic information may be used to compare two or more DRDs and determine if they can be considered to be neighboring devices.

In step 406, a comparison report is generated based on environmental information for at least two demand response devices. As discussed above, the environmental information can include information relating to location, temperature and/or humidity for each respective device. In some aspects, the environmental information may include statistical comparisons of environmental measurements collected for one or more DRDs, such as mean or median indications of temperatures and/or humidity levels from other DRDs.

It is understood that the presentation/display of environmental information can also be performed in a number of ways, including through the use of charts, graphs or other graphics (e.g., info-graphics). Environmental information may be presented in a manner that compares environmental information for one DRD, against data for one or more other DRDs, e.g., in a ranking or a side-by-side comparison. In this manner, displayed environmental information can includes charts/graphs showing how a particular customer's interior home temperature compares to the mean/median interior temperature for one or more neighboring DRDs. By way of example, the information may also be in the form of some other statistic (e.g., your interior temperature is above/below 88% of your neighbors, your temperature is 45% less efficient than your average neighbor, please consider raising/lowering your set point to X degrees).

In some aspects, comparison reports are generated for one or more neighboring devices upon a determination that environmental variables are significantly different as between two or more devices. By way of example, a comparison report may be generated for a first DRD if the ambient temperature is significantly lower at the first DRD, as compared to a neighboring second DRD device, for example, if the outdoor weather is relatively hot. That is, a user of the first DRD may be provided with a comparison report including information regarding the second DRD in order to encourage the user to raise his/her thermostat settings on a hot day.

In one illustrative example, on a peak event caused by hot weather, the customer may be informed that the average neighbor home temperature is 78 degrees while the customer's home temperature is 74 degrees. Therefore, the customer may be urged to increase his/her thermostat set point to 78 degrees, or more, to be more energy efficient. In many ways, temperature comparisons are more accurate than set point comparisons since a set point may not indicate the temperature in a home and temperatures that neighbors are enduring. Temperature comparisons may also be more relatable than energy usage comparisons since temperature comparisons are less dependent on home size, HVAC efficiency, heating fuel type, home insulation, and other differences in neighbor homes.

In another example, a comparison report may be generated for a first DRD when the reported ambient temperature at the first DRD is significantly higher, as compared to a neighboring second DRD, if the outdoor weather is relatively cold. That is, notifications/reports may be triggered in response to a threshold difference in environmental readings as between two or more DRD devices. Similar to the above, the comparison report serves to notify the user of the first DRD that his/her thermostat settings may be lowered/hired, for example, to reduce power consumption on a cold/hot day.

In yet another illustrated example, notifications may be sent to one or more DRDs, for example, in response to the occurrence of a demand response event in the associated area. That is, notification reports can be sent in response to a forecasted peak demand event for a particular area, e.g., geographic region, neighborhood, or portion of resource delivery infrastructure (power grid).

In step 408, a comparison report is provided to at least one demand response device, from among multiple neighboring devices. Comparison report information may be transmitted to a demand response device using different (or multiple) communication channels, depending on the desired implementations. For example, comparison report information may be transmitted to a DRD using a packet-switched network, such as the Internet. Additionally, comparison report information may be communicated to a DRD using a cellular telephone network, such as via a Short Messaging Service (SMS) protocol.

Figure 5:
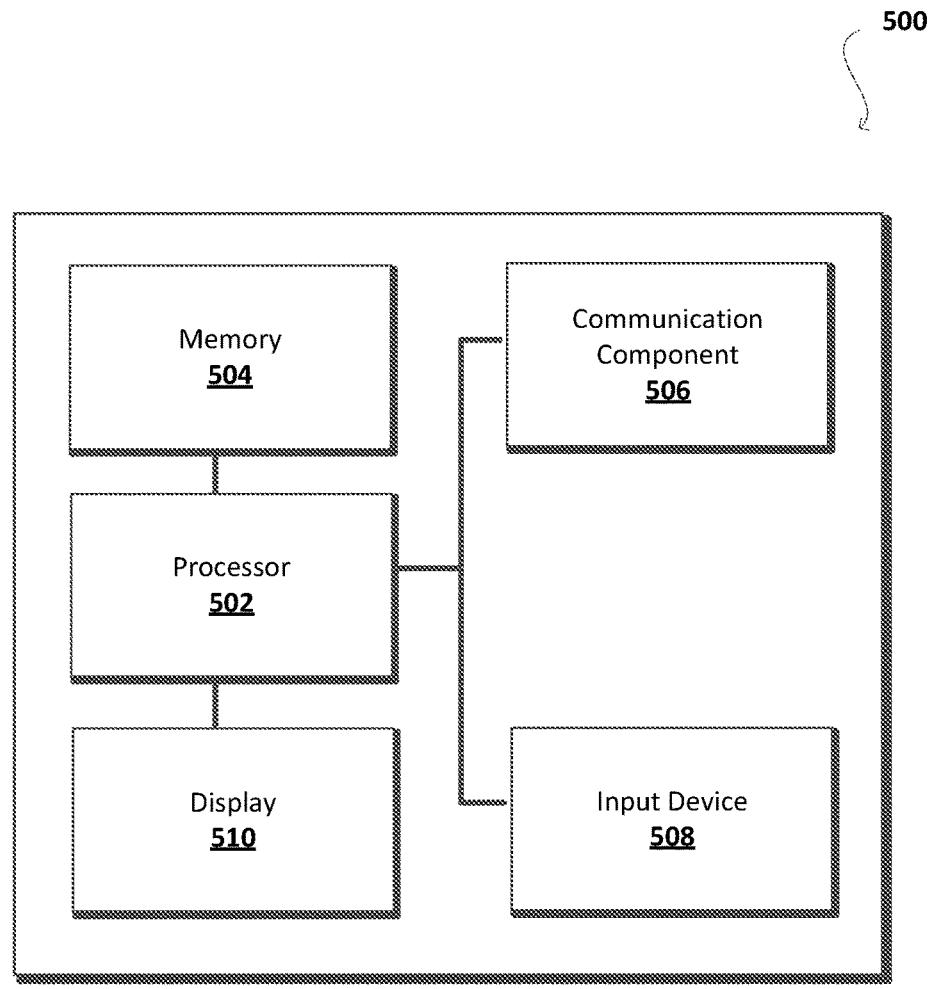
FIG. 5. illustrates a block diagram of hardware components that may be used to implement a notification system, according to some aspects of the subject technology.

FIG. 5 illustrates an example configuration of components of computing device 500, which may be used to implement a notification system, as discussed above with respect to FIGS. 1-4. In this example, computing device 500 includes processor 502 for executing instructions stored in memory device or element 504. The instructions can cause computing device 500 to execute a computer-implemented method, for example, for providing comparison reports to one or more demand response devices, see for example, FIG. 4.

As would be apparent to one of skill in the art, computing device 500 can include various types of memory, data storage, and/or non-transitory computer-readable storage media, such as a first data storage for program instructions for execution by the processor 502, a separate storage for usage history or user information, a removable memory for sharing information with other devices, etc. Depending on implementation, computing device 500 can include one or more communication components 506, such as a Wi-Fi, Bluetooth®, radio frequency, near-field communication, wired, and/or wireless communication system.

In some aspects, computing device 500 may communicate with a network, such as the Internet, and may be configured to communicate with other such devices, such as one or more DRDs (e.g., DRD 1-6 or climate control devices). Computing device 500 may include at least one input element 508 configured to receive input from a user. Such inputs may include, for example, one or more push button/s, touch pad/s, touch screen/s, wheel/s, joystick/s, keyboard/s, a mouse, keypad/s, or other such devices or elements enabling a user to input a command to the device. In some embodiments, however, such a device might not include any buttons at all, and might be controlled only through a combination of visual and audio commands, such that a user can control the device without having to be in contact with the device. Computing device 500 includes some type of display element 510, such as a touch-screen or liquid crystal display (LCD).

The various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business map servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

It is understood that other environmental variables, such as humidity may be used to determine when comparison reports are generated and/or sent to a particular DRD. In some implementations, humidity can be used as one factor for determining how "comfortable" a particular temperature feels. By way of example, if one DRD location is substantially more humid than another, provided notification information may include (1) suggestions to adjust humidity, rather than temperature, and/or (2) encouragement to the user to be more tolerant of discrepancies in temperature because it will "feel" different.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN"). Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate storage media used in the art, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The description of the subject technology is provided to enable any person skilled in the art to practice the various embodiments described herein. While the subject technology has been particularly described with reference to the various figures and embodiments, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these embodiments will be readily apparent to those skilled in the art, and generic principles defined herein may be applied to other embodiments. Thus, many changes and modifications may be made to the subject technology, by one having ordinary skill in the art, without departing from the scope of the subject technology.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various embodiments described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A notification system configured for generating comparison reports for one or more demand response devices, the notification system comprising:
    one or more processors, and
    a non-transitory computer-readable medium comprising instructions stored therein, which when executed by the processors, cause the processors to perform operations comprising:
    receiving at least one temperature report for each of a plurality of demand response devices, wherein each of the temperature reports comprises ambient temperature information and geolocation data for a respective one of the plurality of demand response devices;
    identifying two or more demand response devices that are within a geographic location of each other;
    determining a temperature condition for each of the two or more demand response devices based upon the corresponding temperature report;
    determining a variation in temperature conditions between the two or more demand response devices based upon a comparison of the temperature conditions of the two or more demand response devices;
    generating a comparison report based on the ambient temperature information and the geolocation data for at least the two or more demand response devices; and
    responsive to the variation in temperature conditions exceeding a threshold, transmitting the comparison report, including instructions to change a setting of a thermostat, to at least one of the two or more demand response devices.

2. The notification system of claim 1, wherein the instructions for transmitting further comprise instructions that when executed cause the one or more processors to:
    provide the comparison report to a first one of the two or more demand response devices, wherein the comparison report comprises ambient temperature information associated with a second one of the two or more demand response devices.

3. The notification system of claim 1, wherein the instructions for generating further comprise instructions that when executed cause the one or more processors to generate the comparison report based on weather information for a geolocation of at least one of the plurality of demand response devices.

4. The notification system of claim 1, wherein the instructions for generating further comprise instructions that when executed cause the one or more processors to generate the comparison report to include instructions indicating at least one behavior for reducing electric power consumption.

5. The notification system of claim 1, wherein the instructions for generating further comprise instructions that when executed cause the one or more processors to generate at least a portion of the comparison report to be displayable on a display module of a demand response device.

6. The notification system of claim 1, wherein each of the temperature reports comprises humidity information associated with the corresponding demand response device.

7. A non-transitory computer-readable storage medium comprising instructions stored therein, which when executed by one or more processors, cause the processors to perform operations comprising:
  receiving at least one temperature report for each of a plurality of demand response devices;
  identifying two or more demand response devices that are within a geographic location of each other;
  determining a temperature condition for each of the two or more demand response devices based upon the corresponding temperature report;
  determining a variation in temperature conditions between the two or more demand response devices based upon a comparison of the temperature conditions of the two or more demand response devices;
  generating a comparison report for at least the two or more demand response devices; and
  responsive to the variation in temperature conditions exceeding a threshold, transmitting the comparison report, including instructions to change a setting of a thermostat, to at least one of the two or more demand response devices.

8. The non-transitory computer-readable storage medium of claim 7, wherein each of the temperature reports comprises ambient temperature information and geolocation data for a respective one of the plurality of demand response devices, and
  wherein the instructions for generating further comprise instructions that when executed cause the one or more processors to generate the comparison report based on the ambient temperature information and the geolocation data.

9. The non-transitory computer-readable storage medium of claim 7, wherein the instructions for the transmitting further comprise instructions that when executed cause the one or more processors to:
  provide the comparison report to a first one of the two or more demand response devices, wherein the comparison report comprises ambient temperature information associated with a second one of the two or more demand response devices.

10. The non-transitory computer-readable storage medium of claim 7, wherein the instructions for generating further comprise instructions that when executed cause the one or more processors to generate the comparison report based on weather information for a geolocation of at least one of the plurality of demand response devices.

11. The non-transitory computer-readable storage medium of claim 7, wherein the instructions for generating further comprise instructions that when executed cause the one or more processors to generate the comparison report to include instructions indicating at least one behavior for reducing electric power consumption.

12. The non-transitory computer-readable storage medium of claim 7, wherein the instructions for generating further comprise instructions that when executed cause the one or more processors to generate at least a portion of the comparison report to be displayable on a display module of a demand response device.

13. The non-transitory computer-readable storage medium of claim 7, wherein each of the temperature reports comprises humidity information associated with the corresponding demand response device.

14. A computer-implemented method performed by a computing device comprising a processor, the computer-implemented method comprising:
  receiving at least one temperature report for each of a plurality of demand response devices;
  identifying two or more demand response devices that are within a geographic location of each other;
  determining a temperature condition for each of the two or more demand response devices based upon the corresponding temperature report;
  determining a variation in temperature conditions between the two or more demand response devices based upon a comparison of the temperature conditions of the two or more demand response devices; and
  responsive to the variation in temperature conditions exceeding a threshold:
    generating a comparison report for at least the two or more demand response devices; and
    transmitting the comparison report, including instructions to change a setting of a thermostat, to at least one of the two or more demand response devices.

15. The computer-implemented method of claim 14, wherein each of the temperature reports comprises ambient temperature information and geolocation data for a respective one of the plurality of demand response devices, and
  wherein the computer-implemented method further comprises generating the comparison report based on the ambient temperature information and the geolocation data.

16. The computer-implemented method of claim 14, wherein the computer-implemented method further comprises:
  providing the comparison report to a first one of the two or more demand response devices, wherein the comparison report comprises ambient temperature information associated with a second one of the two or more demand response devices.

17. The computer-implemented method of claim 14, wherein the computer-implemented method further comprises generating the comparison report based on weather information for a geolocation of at least one of the plurality of demand response devices.

18. The computer-implemented method of claim 14, wherein the computer-implemented method further comprises generating the comparison report to include instructions indicating at least one behavior for reducing electric power consumption.

19. The computer-implemented method of claim 14, wherein the computer-implemented method further comprises generating at least a portion of the comparison report to be displayable on a display module of a demand response device.

20. The computer-implemented method of claim 14, wherein each of the temperature reports comprises humidity information associated with the corresponding demand response device.

* * * * *